US006922228B2

United States Patent
Chou et al.

(10) Patent No.: US 6,922,228 B2
(45) Date of Patent: *Jul. 26, 2005

(54) COOLING DEVICE FOR REFLECTIVE LIQUID CRYSTAL IMAGE KERNEL

(76) Inventors: Bor-Bin Chou, No. 11, Li-Hsin Rd., Science-Based Industrial Park, Hsin-Chu City (TW); Chih-Chung Kang, No. 11, Li- Hsin Rd., Science-Based Industrial Park, Hsin-Chu City (TW); Chien-Ming Tsao, No. 11, Li-Hsin Rd., Science-Based Industrial Park, Hsin-Chu City (TW)

( * ) Notice: Subject to any disclaimer, the term of this patent is extended or adjusted under 35 U.S.C. 154(b) by 0 days.

This patent is subject to a terminal disclaimer.

(21) Appl. No.: 10/065,349

(22) Filed: Oct. 8, 2002

(65) Prior Publication Data

US 2003/0086051 A1 May 8, 2003

(30) Foreign Application Priority Data

Oct. 24, 2001 (TW) ........................................ 90218401 U

(51) Int. Cl.[7] .......................... G02F 1/1333; G02F 1/13; F21V 29/00
(52) U.S. Cl. .............................. 349/161; 349/1; 349/58; 362/373
(58) Field of Search ............................... 349/1, 58, 161; 362/373, 580

(56) References Cited

U.S. PATENT DOCUMENTS

| | | | | |
|---|---|---|---|---|
| 6,111,630 A | * | 8/2000 | Watanuki et al. | 349/161 |
| 6,377,318 B1 | * | 4/2002 | Menard | 348/745 |
| 6,481,854 B1 | * | 11/2002 | Sugawara et al. | 353/52 |
| 2003/0179591 A1 | * | 9/2003 | Chou et al. | 362/580 |

* cited by examiner

*Primary Examiner*—Dung T. Nguyen
(74) *Attorney, Agent, or Firm*—Raymond Y. Chan; David and Raymond

(57) ABSTRACT

A cooling device for a reflective liquid crystal image kernel has an air duct unit on the external case, which is separated into front and rear end ducts and has an axial fan blowing downward. A guide plane has both of its lateral sides aslant downward to guide part of the air flow blown from the axial fan to the split air duct of each light valve on the outer side of the air duct unit to cool the outer surface of three light valves fixed on the outer case of the kernel. The air blown downward from the axial fan passes through the front and the rear air ducts of the air duct unit directly, and passing through the ventilation holes of the external case into the optical components such that a single fan is used to enhance heat dispersion and reduce noise.

5 Claims, 8 Drawing Sheets

COOLING DEVICE FOR REFLECTIVE LIQUID CRYSTAL IMAGE KERNEL

BACKGROUND OF INVENTION

1. Field of the Invention

The present invention relates to a cooling device for a projection displaying, more particularly to a cooling device for a reflective liquid crystal image kernel.

2. Description of the Related Art

As the optical electronics technology is developed in a fast growing phase, a general projector device usually uses a high power light bulb as the light source for the projection in order to have a brighter and clearer image on the screen and provide a comfortable view environment to users. However, the high power light bulb creates the problem of high temperature and heat dispersion in the meanwhile. In order to cool the heat generated by the high power light bulb shining on the optical components and further avoid the optical components from deteriorating due to the high temperature, the image kernel of the projection by prior-art projector device uses fans for cooling. However, fans will create another noise problem. Therefore, the way of effectively dispersing heat and reducing noise becomes an important research and development subject for the image projector industry.

Please refer to FIG. 1 and FIG. 2. In FIG. 1, it shows the perspective view of the image kernel 10 for the prior art projector; FIG. 2 is the schematic view of the layout of the corresponding optical components in the image kernel 10 for such prior art projector. The image kernel has a lamp (not shown in the figure) under the image kernel 10 for the projection, and the beam emitted by the lamp as shown in FIG. 2 passes through the optical components such as the X-plate 12, polarizers 131, 132, 133, half wave plates 141, 142, 143, light valves 151, 152, 153 and X-cube 16 in the external case 10 of the projection image kernel 10 for the processing. The X-plate 12 separates the white light into three different color lights: red, blue, and green. These color lights are introduced to three units modulating elements composed of polarizers 131, 132, 133, half-wave plates 141, 142, 143 and light valves 151, 152, 153 for the modulation. The X-cube 16 combines the light and then the light is projected to the screen by the projection lens at the front end of the X-cube. Since the optical components in the projection image kernel 10 for processing the light have been widely used in the industry and also not the feature of the present invention, therefore the process of combining light and their relation are not described here.

When the high intensity light emitted from the aforementioned high power projection lamp passes through the optical components such as the X-plate 12, polarizers 131, 132, 133, half wave plates 141, 142, 143, light valves 151, 152, 153 and X-cube 16, those optical components produce heat of high temperature due to the illumination. The heat must be dispersed effectively to limit the temperature within the appropriate range for the material of those optical components, or else the heat will deteriorate the color and uniformity of the image and reduce the quality of the projection. When it gets more serious, the expensive optical components will be damaged. Although the high intensity light of the foregoing high power projection lamp passes through the optical components along the optical path of the projector, it will generate high-temperature heat. The present invention is to solve the heat dispersion problem of the optical components of the reflection liquid crystal projection kernel 10, and thus the following will only describe the heat dispersion of the reflective liquid crystal image kernel related to the present invention.

In FIG. 1 and FIG. 2, they show that the three light valves 151, 152, 153 of the prior art reflective liquid crystal image kernel 10 are fixed on the front and the two lateral sides of the external case 11, and fans 171, 172 are disposed at the ventilation holes 111, 112 on the aslant surface in the front of the external case 11, and the fans 171 and 172 are disposed between the three light valves 151, 152, 153 and draw air from the outside. The air is blown from three units of modulating elements to the related optical components (the arrow in FIG. 2 indicates the direction of the air flow) so that the heat of the optical components such as the X-plate 12, polarizers 131, 132, 133, half wave plates 141, 142, 143, light valves 151, 152, 153 and X-cube 16 in the external case 11 can be dispersed. However, the top of the external case 11 is sealed, and only the bottom has openings, and the three light valves 151, 152, 153 are fixed on the sides of the external case 11, and most air flow blew between the three modulating elements from the fans 171, 172 only can be blown to the optical components such as the X-plate 12, polarizers 131, 132, 133, half wave plates 141, 142, 143, and X-cube 16, and only a small portion of the reflected air is blown to the inner surface of the three light valves 151, 152, 153, but the air flow is totally unable to be blown to the outer surface of the external case 11. Therefore, it causes non-uniform air flow field in the external case 11 and the light valves 151, 152, 153 cannot disperse heat effectively and will affect the function of optical components such as light valves 151, 152, 153 or even deteriorate the components due to the high-temperature heat and lower the quality of the entire projector. In addition, the optical components on both sides in the case of the reflection liquid crystal projection kernel 10 can disperse heat by using the two fans 171, 172 on both sides. However, they will increase the volume of noise at the same time.

SUMMARY OF INVENTION

It is an object of the invention to provide a branch for the cooling device of the reflection liquid crystal kernel by distributing the air uniformly inside and outside the image kernel to enhance the heat dispersion efficiency of the optical components and keep the quality of projection, and increase the lifetime of the optical components.

It is another object of the invention to provide a branch for the cooling device for the reflective liquid crystal image kernel by arranging fans and air duct to fully utilize the heat dispersion capability of air flow in order to reduce the number of fans used, lower the cost, and reduce the noise as well.

In order to attain the foregoing objects, an air duct unit is disposed on the external case of the reflective liquid crystal image kernel according to the present invention and the air duct unit having an axial fan blowing downward, wherein the air duct unit being separated into a front air duct and a rear air duct by partition, and a fist air duct being disposed in the front air duct, and a guide plane having both of its lateral sides aslant downward to guide part of the air flow blown from the axial fan to the split air duct of each light valve on the outer side of the air duct unit to cool the outer surface of the three light valves fixed on the outer case of the reflection liquid crystal image kernel, and the air blown downward from the axial fan passes through the front and the rear air ducts of the air duct unit directly, and passing though the ventilation holes of the external case into the optical components such as the X-plate, polarizer, half wave plate, and X-cube, such that a single fan is used to guide and effectively use the air flow through the air duct unit and thus enhances the heat dispersion and reduces the noise.

BRIEF DESCRIPTION OF DRAWINGS

The invention will now be described in terms of a limited number of preferred embodiments, with reference to the drawings, in which.

DETAILED DESCRIPTION

Referring to the associated drawings, the embodiments of the present invention are now discussed in detail.

Since the reflective liquid crystal image kernel separates the light from the light source into three colors of red, blue, and green in the proportion of approximately about 1:3:7, therefore the heat generated by the illumination on the optical components of the red modulating element will be the least, requiring relatively the least air flow among all other color light modulating elements for the heat dispersion. The airflow effectively blown from the fan can improve the heat dispersion efficiency. The first preferred embodiment of the present invention adopts the air duct design with different diameters according to the quantity of heat generated from the illumination on each modulating element and allocates different quantity of air flow to each of the color light modulating element.

Figure 1:
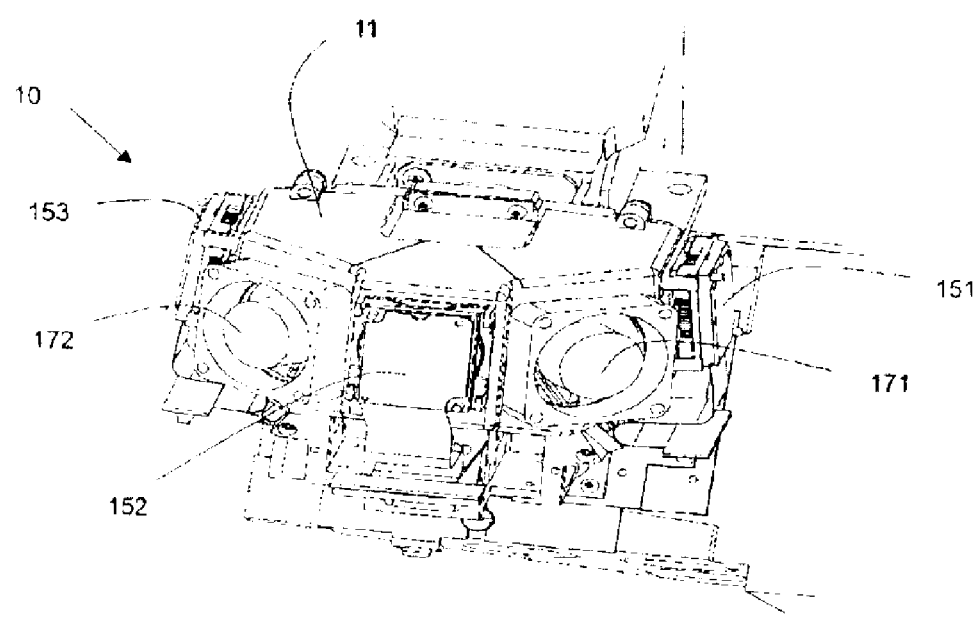
FIG. 1 is a perspective view showing a cooling device for a prior-art reflective liquid crystal image kernel.
Figure 2:
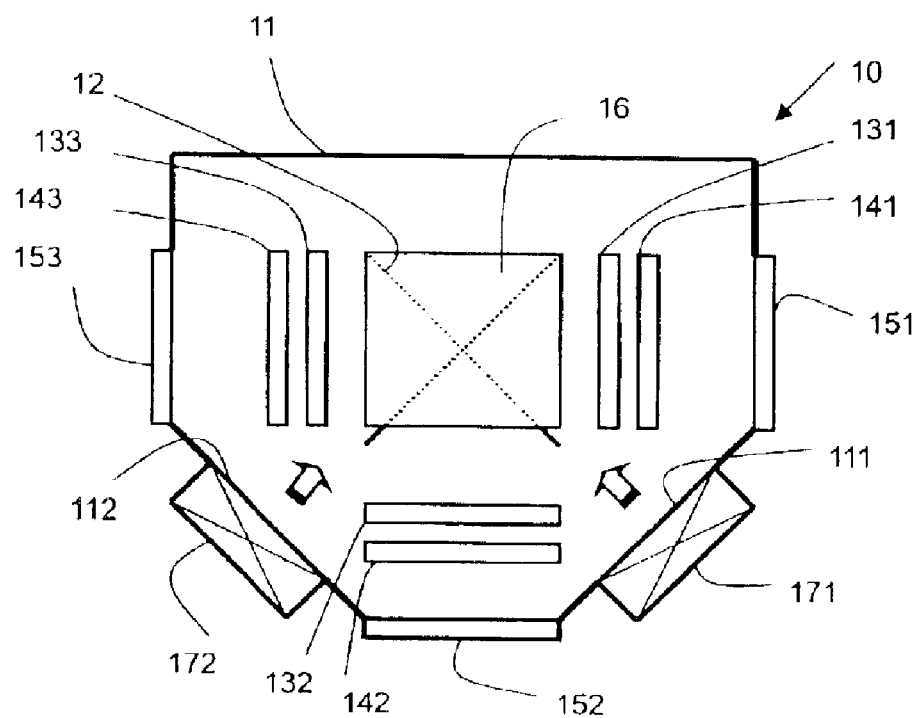
FIG. 2 is a schematic view of the layout of the optical components inside the cooling device for the prior-art reflective liquid crystal image kernel shown in FIG. 1.
Figure 3:
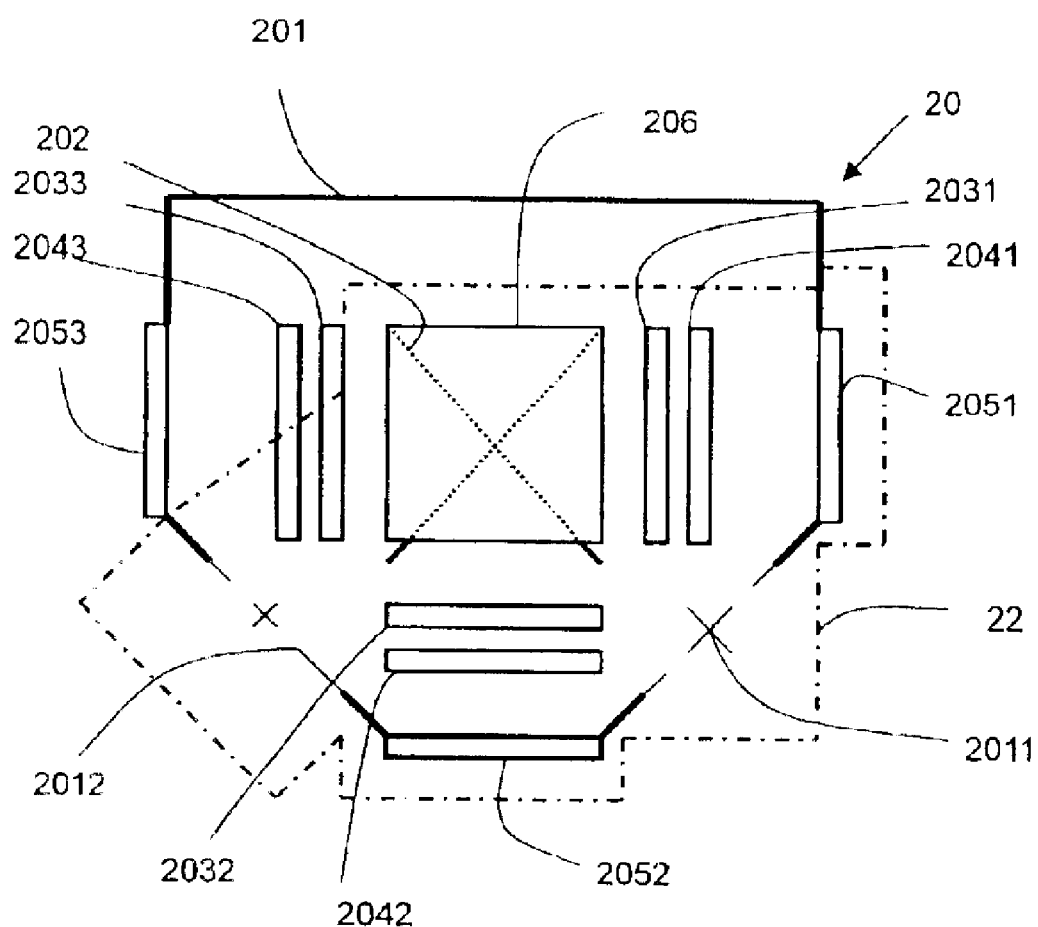
FIG. 3 is atop view showing the layout of the optical components inside the cooling device for the reflective liquid crystal image kernel according to a first embodiment of the present invention.

Please refer to FIG. 3 showing the top view of the cooling device for the reflective liquid crystal image kernel 20. Two ventilation holes are disposed on the aslant surface of the external case 201 for the reflective liquid crystal image kernel 20. Except no fan is installed, the layout of basic components is similar to that of the prior art. A projection lamp (not shown in the figure) is installed under the reflective liquid crystal image kernel 20, and the projection lamp emits a light beam that passes through the optical components such as X-plate 202, polarizers 2031, 2032, 2033, half wave plates 2041, 2042, 2043, light valves 2051, 2052, 2053, and X-cube 206 that are disposed inside the external case 201 of the reflective liquid crystal image kernel 20 for separating and combining light. At last, the light projects to the screen by a projection lens (not shown in the figure) at the front end of the X-cube 206. Further, the dotted lines indicate the relative position of the air duct unit 22 according to the preferred embodiment being disposed on the external case 201 of the reflective liquid crystal image kernel 20.

Figure 4:
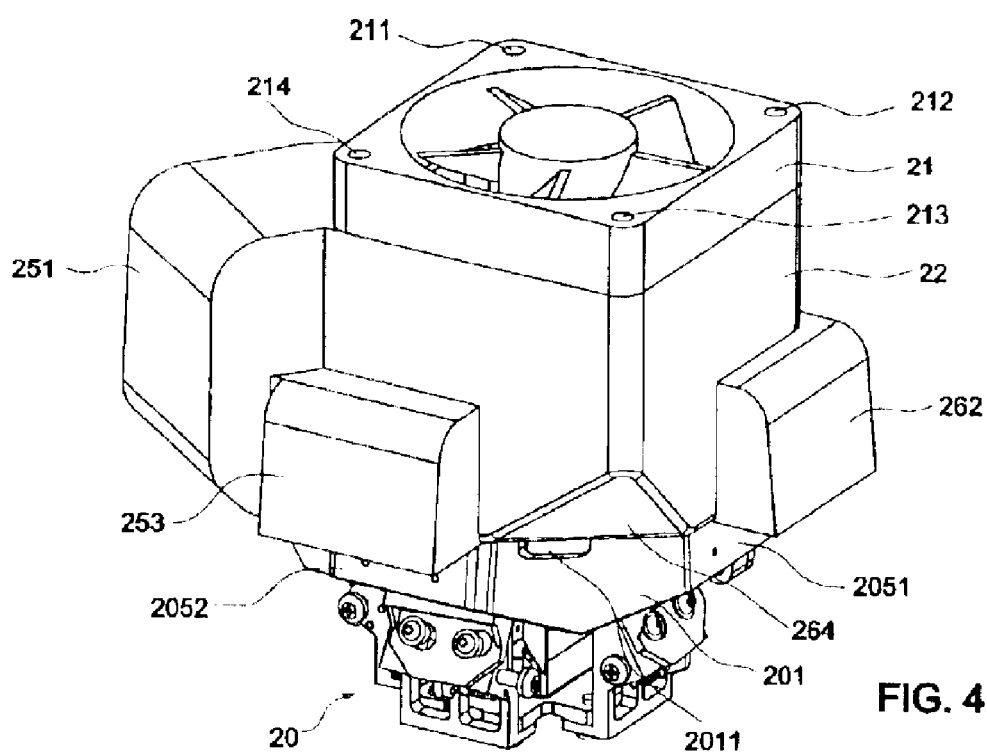
FIG. 4 is a perspective view showing a cooling device for the reflective liquid crystal image kernel according to a first embodiment of the present invention.

Please refer to FIG. 4 for the cooling device of the reflective liquid crystal image kernel according to the first preferred embodiment of the present invention, comprising an air duct unit 22 on the reflective liquid crystal image kernel 20, and an axial fan 21 is disposed on top of the air duct unit 22 blowing air downward and leading the air to each optical component through the air duct of the air duct unit for heat dispersion.

Figure 5:
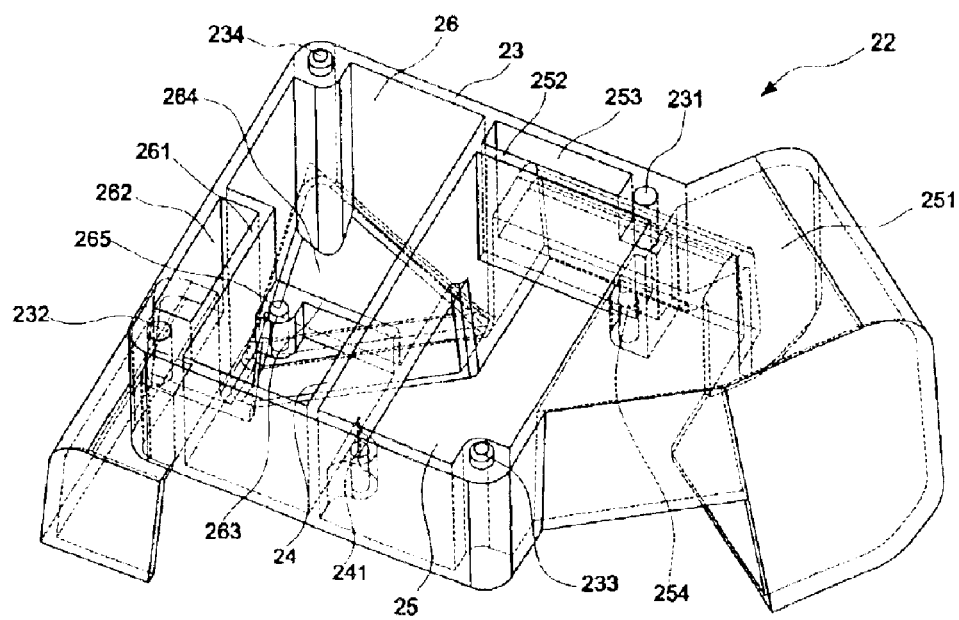
FIG. 5 is a perspective view showing the air duct unit of the cooling device for the reflective liquid crystal image kernel according to a first embodiment of the present invention.

The air duct unit 22 as shown in FIG. 5 is disposed at the central position of the air duct body 23 in the shape corresponsive to the axial fan 21. A partition 24 separates the air duct body 23 into a front air duct 25 and a rear air duct 26, and a first air duct 251 having a larger diameter is disposed on a side of the air duct body 23 of the front air duct 25, and the first air duct 251 is extended downward from the air duct body 23, and its exit is led to a ventilation hole 2012 on the side of the reflective liquid crystal image kernel 20 and seal the entire ventilation hole 2012. Furthermore, on an end of the front air duct 25 and at the position on the inner side of the air duct body 23 corresponsive to the position of the light valve 2052, a partition 252 forms a second air duct 253 under the air duct body 23, having a smaller diameter, and being extended outward, and its exit leads to the outer surface of the light valve 2052, and forms an opening exit. As to the rear air duct 26, a third air duct 262 having a small diameter is formed by the partition 261 at the position corresponsive to the lateral side of the optical valve 2051. The third air duct 262 under the air duct body 23 is extended outward, and its exit leads to the outer surface of the light value 2051, and forms an opening exit. A fourth air duct 264 having a mid-size diameter is formed under an end of the third air duct 262 corresponsive to the rear air duct 26, and its exit leads to a ventilation hole 2011 on the lateral side for the reflective liquid crystal image kernel 20 and covers half of the ventilation hole 2011. Furthermore, a lower fixing rib 263 is disposed at the center of the rear air duct 26, on which a bolt hole 265 is disposed to work with the bolt hole 241 on the edge of the partition 24 and the bolt hole 254 on the edge of the partition 252 and the air duct unit 22 is then fixed on the external case 201 for the reflective liquid crystal image kernel 20. The four corners of the air duct body 23 are corresponsive to the screws 211, 212, 213, 214 at the four corners of the axial fan 21, and a pair of screw holes 231, 232 and position posts 233, 234 are set to fix the axial fan 21 onto the air duct 22.

When the cooling is performed by the cooling device for the reflective liquid crystal image kernel according to the first preferred embodiment of the present invention, the axial fan 21 at the utmost upper section for the reflective liquid crystal image kernel 20 draws air from the outside. Most of the air are blown to the ventilation holes 2011, 2012 on the side of the external case 201 for the reflective liquid crystal image kernel 20 through the first air duct 251 and the fourth air duct 264 of the air duct unit 22 having the largest diameter and is blown into the interior of the reflective liquid crystal image kernel 20 for cooling the optical components such as the X-plate 202, polarizers 2031, 2032, 2033, half wave plates, 2041, 2042, 2043, and X-cube, and the inner surface of the light valves 2051, 2052, 2053. Small portion of the air is blown to the outer surface of the light valves 2052, 2051 through the second air duct 253 and the third air duct 262 having the small diameter. By the arrangement of the aforementioned design of the air duct 22, most of the air flow from the axial fan 21 is led to cool the blue and green light components according to the heat received from the illumination on different color optical components. As to the red light valve 2053, it almost keeps the original cooling condition. By allocating the cool air flow, the air flow from the fan can be effectively utilized to improve the heat dispersion efficiency, reduce the number of fans used, lower the cost, and reduce the noise as well.

Figure 6:
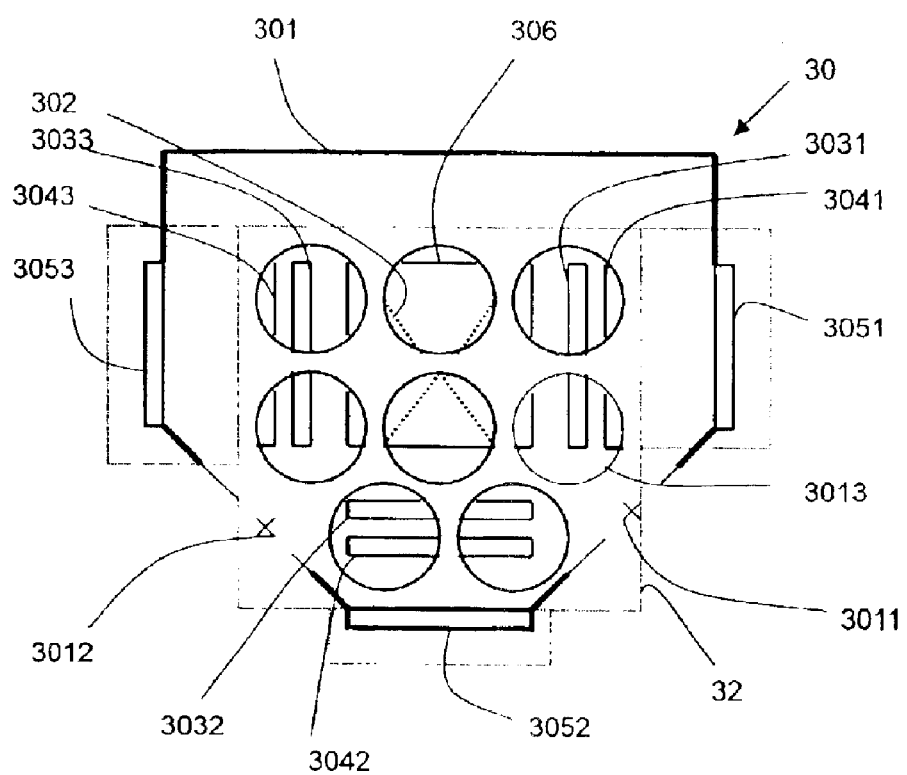
FIG. 6 is the top view showing the reflective liquid crystal image kernel according to a second embodiment of the present invention.

FIG. 6 shows the top view of the external case 301 for the reflective liquid crystal image kernel 30 according to the second preferred embodiment of the present invention. The layout and function of the optical components in it such as the X-plate 302, polarizers 3031, 3032, 3033, half wave plates 3041, 3042, 3043, X-cube 306, and the light valves 3051, 3052, 3053, are identical to those of the first preferred embodiment. The difference of the two resides on that the top of the external case 201 of the first preferred embodiment is sealed, and there are a plurality of through holes 3013 on the surface of the external case 301 for the reflective liquid crystal image kernel 30 of the second preferred embodiment. Furthermore, to make it easier to understand, a dotted line indicates the relative engagement position of the air duct unit 32 and the reflective liquid crystal image kernel 30.

Figure 7:
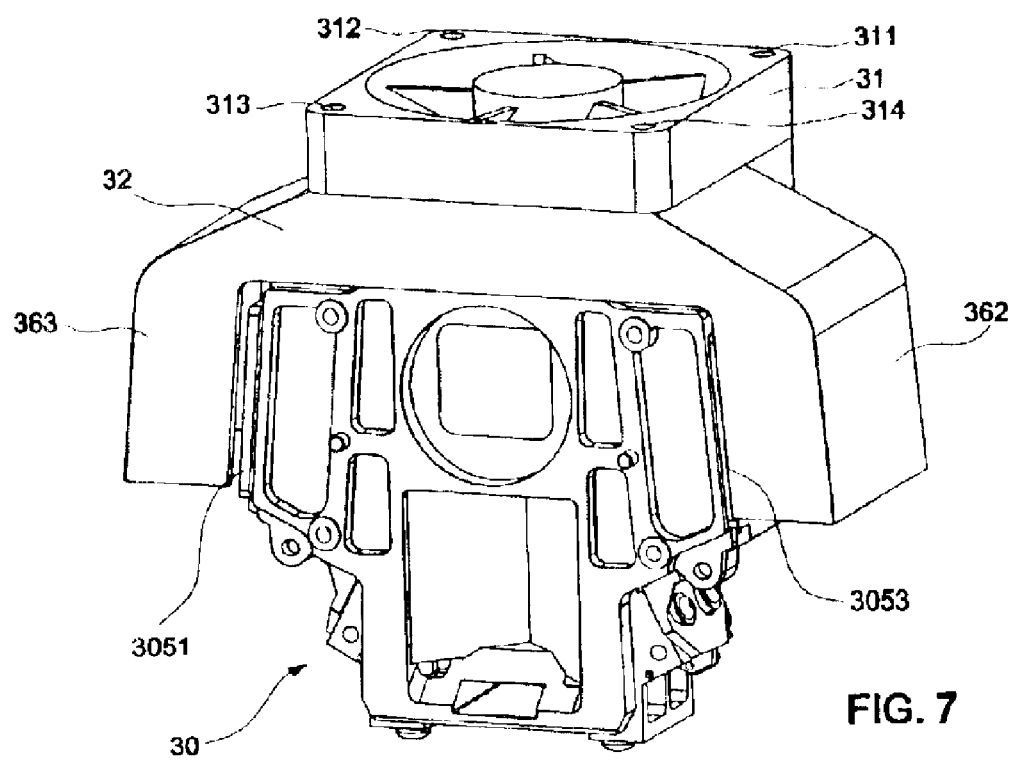
FIG. 7 is a perspective view showing the cooling device for the reflective liquid crystal image kernel according to a second embodiment of the present invention.

FIG. 7 shows the perspective view of the cooling device for the reflective liquid crystal image kernel according to the second preferred embodiment of the present invention. A plurality of through holes 3013 are disposed on the surface of the external case 301 for the reflective liquid crystal image kernel 30, on which an air duct unit 32 is covered, and the air duct unit 32 further comprises an axial fan 31 for leading part of the air downward by the axial fan to those through holes 3013 in order to cool the optical components in the reflective liquid crystal image kernel 30. The rest of the air will be lead to the outer surface of each light valves 3051, 3052, 3053 via the air ducts of the air duct unit 32 for heat dispersion.

Figure 8:
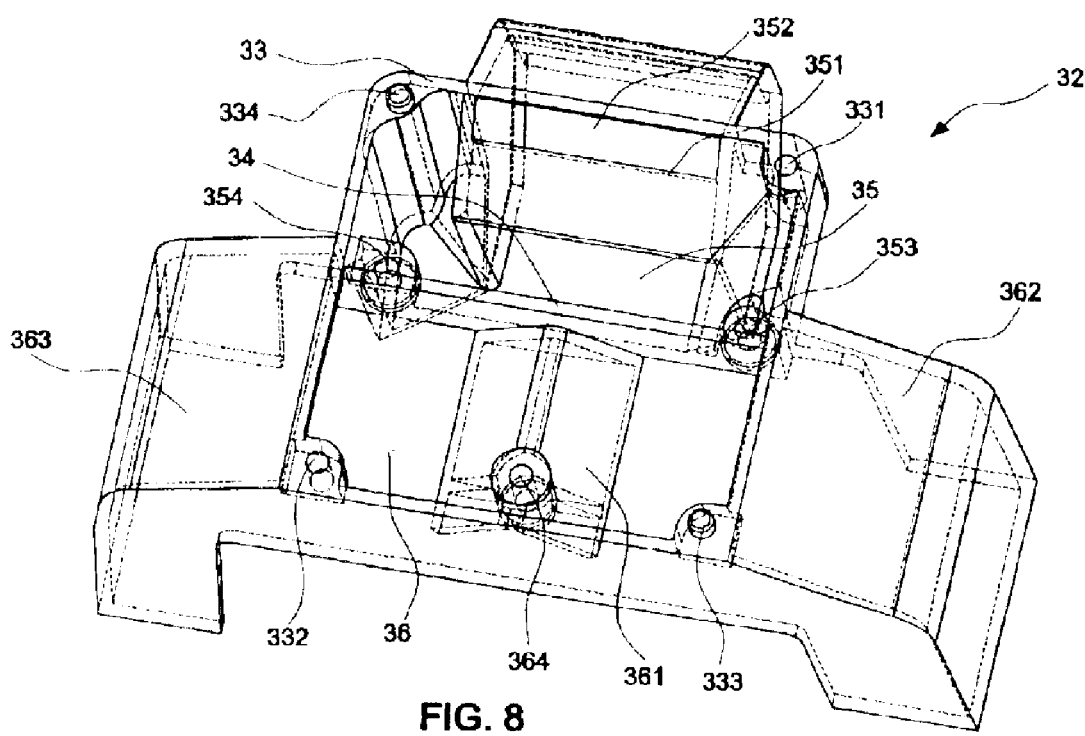
FIG. 8 is a perspective view of the air duct unit of the cooling device for the reflective liquid crystal image kernel according to a second embodiment of the present invention.

The air duct unit 32 as shown in FIG. 8 corresponds to the central position of the body 33 with the shape of the exit of the axial fan 31. A partition 34 isolates the air duct unit 32 into a front air duct 35 and a rear air duct 36; the front air duct 35 at the position corresponsive to the light valve 3052 has a partition 351 on a side of the air duct body 33 to form a first air duct 352. The first air duct 352 is extended outward from the air duct body 33, and its exit leads to the outer surface of the light valve 3052 on the lateral side of the external case 301 for the reflective liquid crystal image kernel 30 and forms an opening exit. Furthermore, two bolt holes 353, 354 are disposed on both ends of the partition 34 on the front air duct 35. As to the rear air duct 36, an air guide 361 aslant on both sides disposed at its center proximate to the lower side divides the rear air duct 36 into two. A second air duct 362 and a third air duct 363 having different diameters are formed on the air duct body 33 on the relative direction of the two aslant surfaces of the air guide 361, and individually extended outward from the air duct body 33. Its exit individually leads to the outer surface of the light valves 3051 and 3053 and forms an opening exit downward. Further, the top of the air guide 361 proximate to the air duct body 33 has a bolt hole 364 to correspond with the two bolt holes 353, 354 of the front air duct 35 to fix the air duct unit 32 onto the external case 301 for the reflective liquid crystal image kernel 30. The four corners of the body 33 correspond to the screw holes 311, 312, 313, 314 of the axial fan 31, and a pair of screw holes 331, 332 and fixing posts 333, 334 are used to fix the axial fan onto the air duct unit 32.

When the cooling is performed by the cooling device of the reflective liquid crystal image kernel 30 according to the second preferred embodiment of the present invention, the axial fan 31 at the utmost upper section of the reflective liquid crystal image kernel 30 draws air from the outside. Most of the air are blown downward from the air duct unit 32 to the ventilation hole 3013 on the side of the external case 301 for the reflective liquid crystal image kernel 30 and inside the reflective liquid crystal image kernel 30 for cooling the optical components such as the X-plate 302, polarizers 3031, 3032, 3033, half wave plates, 3041, 3042, 3043, X-cube 306, and the inner surface of the light valves 3051, 3052, 3053. Part of the air is blown to the outer surface of the light valves 3051, 3052, 3053 through the first air duct 352, the second air duct 362 and the third air duct 363 for heat dispersion. By the arrangement of the aforementioned design unit 32, it simplifies the air duct of the air duct of the first preferred embodiment and also uniformizes the air flow in the air duct unit 32, By allocating the cool air flow, the air flow from the fan can be effectively utilized to improve the heat dispersion efficiency, reduce the number of fans used, lower the cost, and reduce the noise as well.

While the invention has been described by way of examples and in terms of two preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures. For instance, the preferred embodiment of the present invention discloses three light valves of the reflection image kernel, but the present invention can also be implemented by using at least one light valve. Furthermore, the structure and technical feature of the present invention discloses a cooling device of the reflection liquid crystal image kernel, and the design of guiding the air flow via the air duct unit to assure the uniform air flow in the reflective liquid crystal image kernel and effectively utilize the air flow from the fan. The present invention has the effects of improving the heat dispersion efficiency, decreasing the number of fans used, lowering the cost, and reducing the noise. The present invention herein enhances the performance of the conventional structure, and further complies with the patent application requirements and is submitted to the Patent and Trademark Office for review and granting of the commensurate patent rights.

What is claimed is:

1. A cooling device for a reflective liquid crystal image kernel, comprising:

a reflective liquid crystal image kernel having an interior and an external case;

at least one light valve disposed on the side of the external case;

an air duct unit disposed on the external case, wherein at least one partition used to form a plurality of air ducts, and the exit of the air ducts individually leading to the outer surface of the light valve and the interior of the reflective liquid crystal image kernel; and an axial fan fixed to the top of the air duct unit.

2. The cooling device of claim 1, wherein said air duct being extended to the outer side of the air duct unit.

3. The cooling device of claim 1, wherein said partition forming a plurality of air ducts in different diameters in the air duct.

4. The cooling device of claim 1, wherein said reflective liquid crystal image kernel having a plurality of ventilation holes on the side of the external case, and the air duct at least having an exit leading to at least one of the ventilation holes.

5. The cooling device of claim 1, wherein said reflective liquid crystal image kernel having at least a through hole on the surface of the external case.

* * * * *